US008024707B2

(12) United States Patent
Manglik et al.

(10) Patent No.: US 8,024,707 B2
(45) Date of Patent: Sep. 20, 2011

(54) FACILITATING SELF-REMEDIATION FOR SOFTWARE APPLICATIONS

(75) Inventors: Gaurav Manglik, Palo Alto, CA (US); Ambalika Roy, Charlotte, NC (US); Shamik Ganguly, Bangalore (IN); Rahul Gupta, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 1173 days.

(21) Appl. No.: 11/690,143

(22) Filed: Mar. 23, 2007

(65) Prior Publication Data
US 2008/0235659 A1 Sep. 25, 2008

(51) Int. Cl.
*G06F 9/44* (2006.01)
(52) U.S. Cl. ........ 717/124; 717/126; 717/127; 717/129; 717/131; 714/38.1
(58) Field of Classification Search .................. None
See application file for complete search history.

(56) References Cited

U.S. PATENT DOCUMENTS

| | | | | |
|---|---|---|---|---|
| 4,595,981 A * | 6/1986 | Leung | | 714/38.1 |
| 4,853,851 A * | 8/1989 | Horsch | | 714/38.1 |
| 5,784,553 A * | 7/1998 | Kolawa et al. | | 714/38.1 |
| 6,629,123 B1 | 9/2003 | Hunt | | 718/106 |
| 6,634,019 B1 * | 10/2003 | Rice et al. | | 717/127 |
| 6,817,015 B2 * | 11/2004 | Takata | | 717/168 |
| 6,959,431 B1 * | 10/2005 | Shiels et al. | | 717/124 |
| 6,988,262 B1 * | 1/2006 | Mallory et al. | | 717/127 |
| 6,996,806 B2 * | 2/2006 | Bates et al. | | 717/125 |
| 7,493,630 B2 * | 2/2009 | Hunt | | 719/330 |
| 7,823,135 B2 * | 10/2010 | Horning et al. | | 717/127 |
| 2003/0140082 A1 * | 7/2003 | Hase | | 709/102 |
| 2006/0101457 A1 * | 5/2006 | Zweifel et al. | | 717/174 |
| 2006/0206757 A1 * | 9/2006 | Russell et al. | | 714/9 |

OTHER PUBLICATIONS

Title: A Study of Software Fault Detection and Correction Process Models, author: Wu, Y. P. et al, dated: Jun. 21, 2006, source: IEEE.*
Title: Prediction models for software fault correction effort, author: Evanco, W., dated: Aug. 7, 2002, source: IEEE.*
Sudip Datta, Rajat Nigam, Joshua Solomin, Hariprasanna Srinivasan "Using Enterprise Manager to Achieve Grid Automation With Deployment Procedures" Aug. 2007 pp. 1-39. Oracle Corporation, World Headquarters, 500 Oracle Parkway, Redwood Shores, CA 94065, U.S.A. http://www.oracle.com/technology/products/oem/pdf/grid-automation-deployment-procedures.pdf.
"Enterprise Manager 10g Provisioning Pack", http://www.oracle.com/technology/products/oem/pdf/provpack_ds.pdf year, 2006 pp. 1-5.
Sudip Datta, Rajat Nigam, Joshua Solomin, Hariprasanna Srinivasan "Using Enterprise Manager to Achieve Grid Automation With Deployment Procedures" Mar. 2006 pp. 1-14. Oracle Corporation, World Headquarters, 500 Oracle Parkway, Redwood Shores, CA 94065, U.S.A, http://www.oracle.com/technology/products/oem/pdf/grid-automation-deployment-procedures.pdf.

* cited by examiner

*Primary Examiner* — Chameli Das
(74) *Attorney, Agent, or Firm* — Narendra Reddy Thappeta

(57) ABSTRACT

Facilitating self-remediation for software applications. In an embodiment, a self-remediation tool (incorporated in the software application) receives a set of tasks that are to be performed for fixing an error in the software application. The self-remediation tool determines a subset of tasks requiring termination of execution of the software application. A new process is then initialized, which is designed to terminate the software application, perform the subset of tasks and restart the software application.

20 Claims, 7 Drawing Sheets

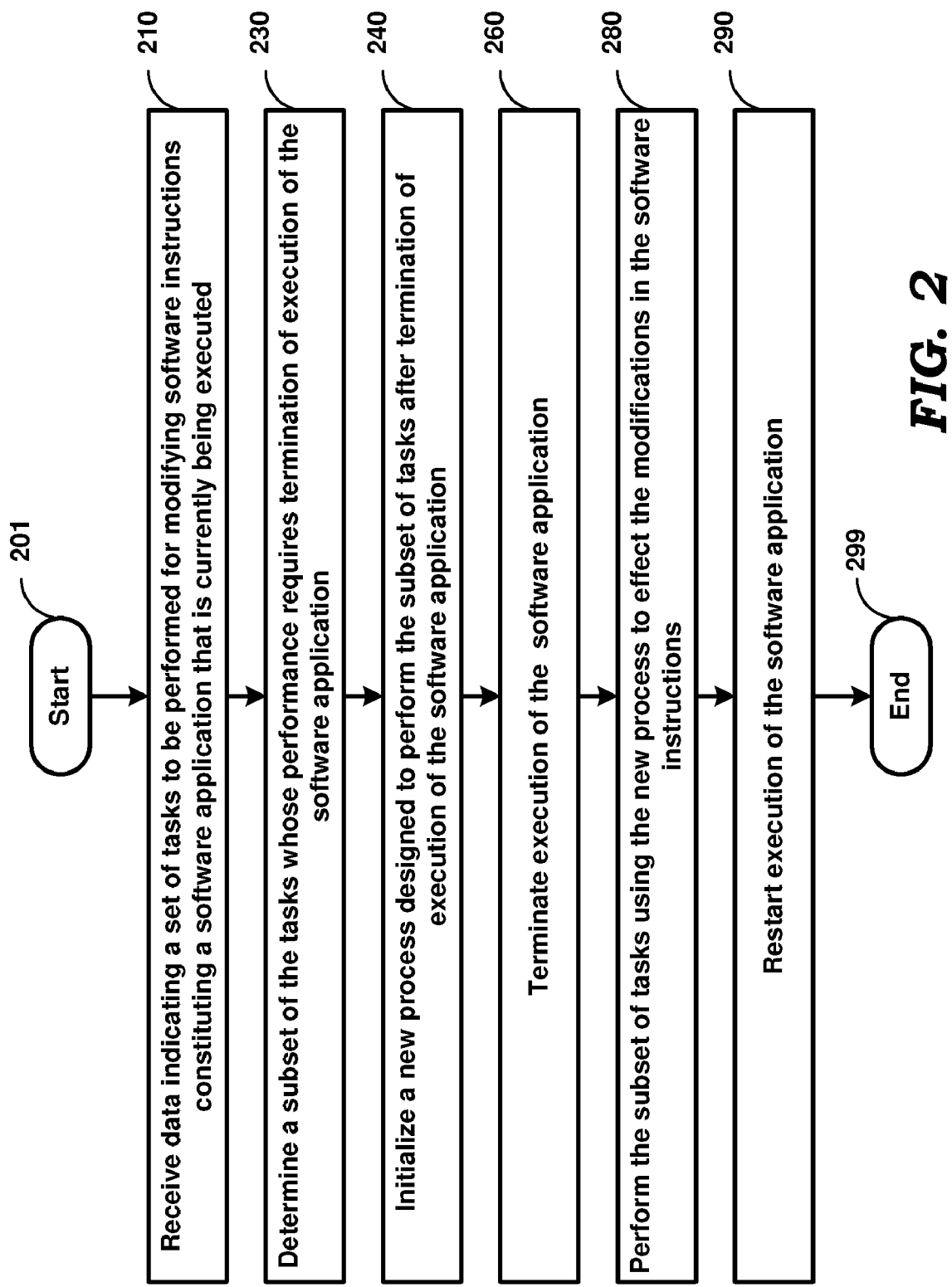

```
311: <procedure name="PATCH ACME DB" type="PatchSoftware" errorMode="stop" version="1.0">
312:   <variable name="patchID" classname="java.util.Vector"/>
313:   <variable name="patchSrc" classname="java.util.Vector"/>
314:   <variable name="acmeDatabase" classname="java.lang.String"/>
315:   <variable name="sqlFile" classname="java.lang.String"/>
316:   <tasks>
317:     <task name="VALIDATE PATCH APPLICABILITY"
318:       description="Validates if the patch is applicable"
319:       task_type="OS_COMMAND"
320:       command="${acmeDatabase}/bin/validate -patchID ${patchID}-patchSrc ${patchSrc}"/>
321:     <task name="SHUT DB"
322:       description="Shuts down the Acme database"
323:       task_type="OS_COMMAND"
324:       command="${acmeDatabase}/bin/shutdown" />
325:     <task name="PATCH DB"
326:       description="Patches the Acme database"
327:       task_type="OS_COMMAND"
328:       command="="${acmeDatabase}/bin/opatch -patchID ${patchID}-patchSrc ${patchSrc}"/>
329:     <task name="START DB"
330:       description="Starts the Acme database"
331:       task_type="OS_COMMAND"
332:       command="${acmeDatabase}/bin/startup"/>
333:     <task name="APPLY SQL DB"
334:       description="Applies SQL scripts to the Acme database"
335:       task_type="OS_COMMAND"
336:       command="${acmeDatabase}/bin/sqlplus -sql ${sqlFile}"/>
337:   </tasks>
338: </procedure>
```

FIG. 3

```
411:  <procedure name="PATCH ACME DB" type="PatchSoftware" errorMode="stop" version="1.0">
412:    <variable name="patchID" classname="java.util.Vector"/>
413:    <variable name="patchSrc" classname="java.util.Vector"/>
414:    <variable name="acmeDatabase" classname="java.lang.String"/>
415:    <variable name="sqlFile" classname="java.lang.String"/>
416:    <tasks>
417:      <task name="VALIDATE PATCH APPLICABILITY"
418:            description="Validates if the patch is applicable"
419:            task_type="OS_COMMAND"
420:            command="${acmeDatabase}/bin/validate -patchID ${patchID}-patchSrc ${patchSrc}"/>
421:      <task name="DOWNTIME TASK 1"
422:            action="downtime"
423:            description="NA"
424:            task_type="OS_COMMAND"
425:            command="${acmeDatabase}/generated/genOSScript.sh -list_of_args
                                                  patchID:${patchID} patchSrc:${patchSrc}"/>
426:      <task name="VERIFY TASK 1"
427:            action="verify"
428:            description="NA"
429:            task_type="VERIFY" />
430:      <task name="APPLY SQL DB"
431:            description=" Applies SQL scripts to the Acme database "
432:            task_type="OS_COMMAND"
433:            command="${acmeDatabase}/bin/sqlplus -sql ${sqlFile}"/>
434:    </tasks>
435:  </procedure>
```

*FIG. 4*

531:   # Shuts down the Acme database
532:   ${acme_home}/bin/shutdown
533:   log("Result = "!')

534:   # Patches the Acme database
535:   ${acme_home}/bin/opatch -patchId {patch_loc}
536:   log("Result = "!')

537:   # Starts the Acme database
538:   ${acme_home}/bin/startup
539:   log("Result = "!')

*FIG. 5*

| ProcedureName | TaskName | DateTime | Status |
|---|---|---|---|
| PATCH ACME DB | VALIDATE PATCH APPLICABILITY | 11/23/2006 01:30 | Success |
| PATCH ACME DB | DOWNTIME TASK 1 | 11/23/2006 01:34 | |
| PATCH ACME DB | VERIFY TASK 1 | 11/23/2006 01:52 | Success |
| PATCH ACME DB | APPLY SQL DB | 11/23/2006 01:57 | Success |

FACILITATING SELF-REMEDIATION FOR SOFTWARE APPLICATIONS

BACKGROUND

1. Technical Field

The present disclosure relates to software maintenance, and more specifically to a method and apparatus for facilitating self-remediation for software applications.

2. Related Art

A software application refers to software code/software instructions that are executed to provide a specific utility to users or other application. It is often observed that during execution, errors in functionality/operation may be discovered such as deviation from the specific utilities sought to be provided, reduction in efficiency, etc.

Deploying fixes for such errors may require the modification of the software instructions constituting a software application. Modification of instructions is often performed by another software application (typically called a patch/remediation tool) provided as a separate set of instructions, which execute independent of the software application. In one embodiment, the remediation tool may not be able to fix errors discovered within the instructions constituting the remediation tool.

Another common approach to deploy fixes for errors is to incorporate instructions (that form the remediation tool) as a part of a software application. In one embodiment, the remediation tool is capable of modifying any of the software instructions constituting the software application (including the instructions constituting the remediation tool), but only during execution of the software application.

Thus, if the deployment of fixes requires termination of execution of the software application, it may not be possible for such a remediation tool (incorporated in the software application) to perform the modifications of the software instructions specified by the fixes.

Various aspects of the present invention facilitate self-remediation (where the remediation tool for deploying fixes for errors is incorporated in the software application) for software applications.

BRIEF DESCRIPTION OF THE DRAWINGS

Example embodiments of the present invention will be described with reference to the accompanying drawings briefly described below.

FIG. 2 is a flowchart illustrating the manner in which self-remediation for software applications are facilitated according to an aspect of the present invention.

FIG. 3 depicts a portion of data indicating the tasks to be performed for deployment of a fix for a software application in an embodiment.

FIG. 4 depicts a portion of data indicating the tasks to be performed for deployment of a fix for a software application where tasks requiring termination of the software application have been replaced with a new task in an embodiment.

FIG. 5 depicts a portion of a file containing the commands to be executed for deployment of a fix in a software application after the termination of the software application in an embodiment.

FIG. 6 depicts the content of a table (in a database) specifying information indicating the tasks performed during deployment of a fix in an embodiment.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

Overview

An aspect of the present invention enables self-remediation of software applications. In an embodiment, a self-remediation tool (incorporated in a software application having errors sought to be fixed) receives a set of tasks that are to be performed for fixing the errors in the software application. The self-remediation tool determines a subset of tasks requiring termination of execution of the software application. A new process is then initialized, which is designed to terminate the software application, perform the subset of tasks and restart the software application.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the features of the invention.

2. Example Environment

Figure 1:
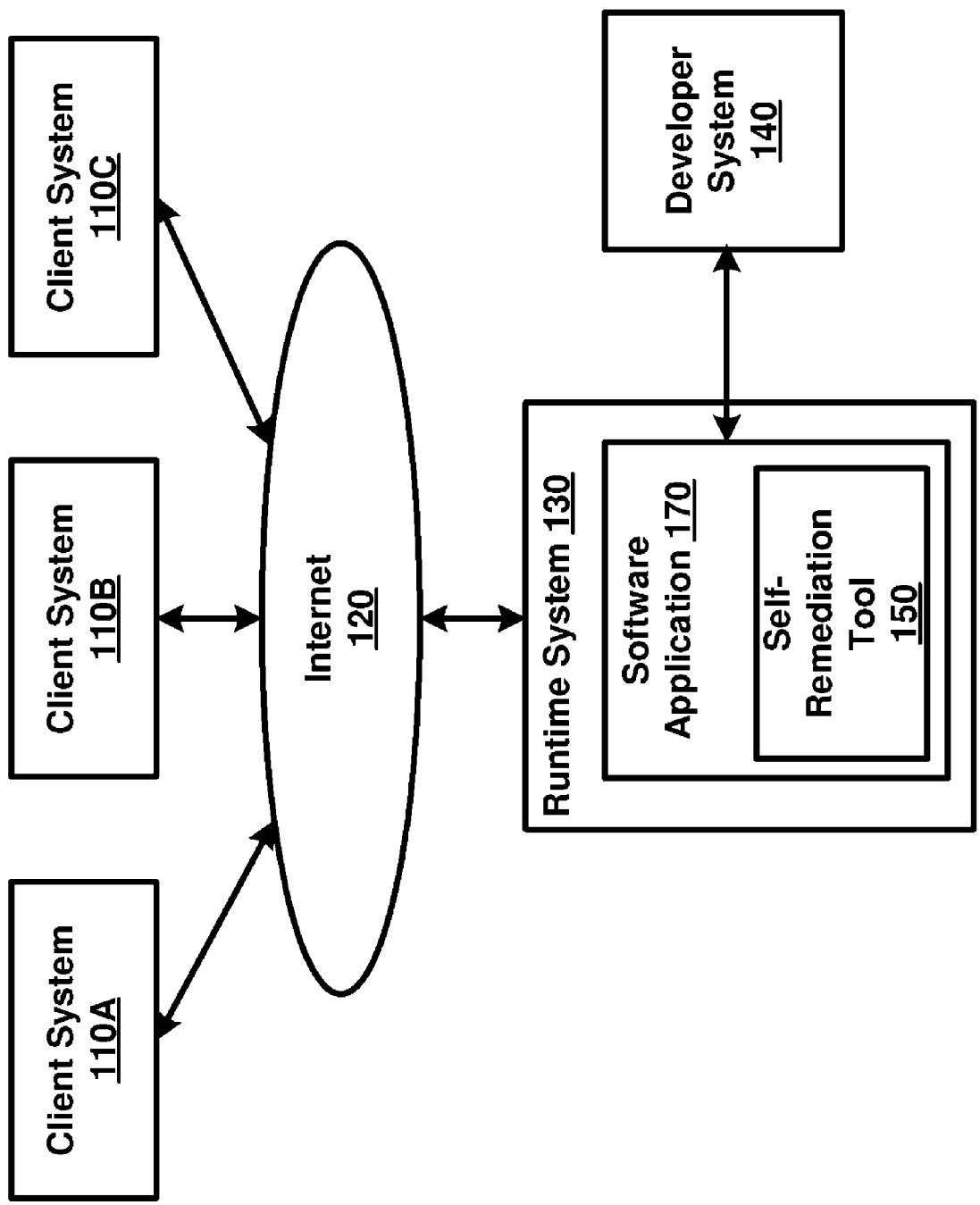
FIG. 1 is a block diagram illustrating an example environment in which several aspects of the present invention can be implemented.

FIG. 1 is a block diagram illustrating an example environment in which several aspects of the present invention can be implemented. The block diagram is shown containing client systems 110A-110C, network 120, runtime system 130 (containing software application 170) and developer system 140. Software application 170 is shown containing self-remediation tool 150. Merely for illustration, only representative number/type of systems are shown in the Figure. Many environments often contain more/less systems, both in number and type. Each system of FIG. 1 is described below in further detail.

Network 120 provides necessary communication between various client systems 110A-110C and runtime system 130. Network 120 may be implemented using protocols such as TCP/IP well known in the relevant arts.

Each of client systems 110A-110C represents a system such as a personal computer, workstation, mobile station, etc., and is used by a user to generate requests to runtime system 130. The requests may be generated according to a suitable interface. In general, a client system requests the runtime system for performing operations and receives corresponding responses containing the results of performance of the requested operations.

Runtime system 130 represents a system, such as a server, which executes software applications (such as software application 170) capable of performing operations requested by client systems 110A-110C. In general, each software application can be executed independently using the underlying operating environment (operating systems such as Unix, Windows, etc). The results of the operations are sent as corresponding responses to the requesting client systems.

It may be appreciated that during the performance of operations by the software pre-installed in the runtime system, various errors may be discovered. These errors may include, for example, logical errors (due to wrong logic), functional errors (due to the software not performing/functioning as expected) or runtime errors (due to problems with the environment in which the software is executed). Such errors (as well as any others detected) require changes to be made to the software instructions constituting software application 170.

Developer system 140 enables users to generate fixes containing modified instructions and to specify the manner (as a set of tasks) in which the fixes may be deployed in software application 170. The fixes may also contain other types of information such as database schema, which may be used to fix errors in software application 170.

Self-remediation tool 150 deploys the fixes received from developer system 140 in software application 170. Self-remediation tool 150 is shown as a portion of software application 170 representing that instructions forming the tool are part of the overall instructions forming the software application, and that the tool executes within the operating context of the software application. In general, self-remediation tool 150 is implemented consistent with the format and conventions used in forming fixes by developer system 140. The manner in which self-remediation tool 150 facilitates software application 170 to perform self-remediation according to several aspects of the present invention, is described in detail below.

3. Facilitating Self-Remediation

FIG. 2 is a flowchart illustrating the manner in which self-remediation for software applications (such as software application 170) are facilitated according to an aspect of the present invention. The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein. In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 201, in which control immediately passes to step 220.

In step 220, self-remediation tool 150 receives data indicating a set of tasks to be performed for modifying software instructions constituting a software application (such as software application 170) that is currently being executed. In general, each task specifies some actions that are to be performed to fix errors. The data may be received from developer system 140 and may be designed to fix an error discovered in software application 170.

In step 230, self-remediation tool 150 determines a subset of the tasks whose performance requires termination of execution of the software application. Each of the subset of tasks may be determined based on any convention, for example, according to a pre-specified format/protocol, labels/names identifying the task, etc.

In an embodiment described below, the tasks are inspected to find a first task terminating software application 170 and a second task restarting software application 170. The first task and the second task along with the intervening taks are determined to be the subset of tasks. In another embodiment, each of the set of tasks may contain a flag indicating that the step requires termination of software application 170. The subset of tasks may be determined by inspecting the flag of each of the task.

In step 240, self-remediation tool 150 initializes a new process (not shown in FIG. 1) designed to perform the subset of tasks after termination of execution of the software application. In general, a process refers to a running instance of a group of instructions constituting the corresponding application, including all variables and other state information maintained by the underlying operating system. The new process may be initialized using techniques such as calling the "fork" (or "pthread") method in a unix environment well known in the relevant arts.

In step 260, the execution of software application 170 is terminated. The termination may be performed by self-remediation tool 150 or by the new process initialized in step 240. The termination of software application 170 may ensure that self-remediation tool 150 is also terminated.

In step 280, the subset of tasks is performed by using the new process to effect the modifications in the software instructions. In an embodiment described below, each of the tasks is associated with a command to be executed for deployment of fixes. The new process iteratively performs the command associated with the subset of tasks.

In step 290, the execution of the software application is restarted by the new process initialized in step 240. In an embodiment decribed below, the subset of tasks contains a final task specifying a command to restart software application 170. Alternatively, the new process may be designed to restart execution of software application 170 upon completion of performance of the subset of the tasks. Various techniques, as provided in the operating environment, may be used to restart execution of software application 170. The flow chart ends in step 299.

It may be appreciated that the set of tasks may contain one or more subsets of tasks that require the termination of execution of software application 170. In such a scenario, the steps of 230, 240, 260, 280 and 290 may be performed for each of the subsets of tasks as determined in step 230. Thus, a software application may perform self-remediation by determining the subsets of tasks that require termination of execution of a software application (incorporating the self-remediation tool). For each of the determined subsets of tasks, a new process is initialized that performs the tasks when the software application is not executing.

The manner in which such self-remediation for software applications is facilitated is described below, with an example.

4. Example Illustration of Self-Remediation

FIGS. 3, 4, 5 and 6 together illustrate the manner in which self-remediation for software applications are facilitated in an embodiment. The figures are described assuming that software application that is being fixed is a database application called "ACME". Each of the figures is described in detail below. In the description below, merely for simplicity, each of the tasks noted above are shown represented in one XML tag. However, it should be appreciated that tasks can represent any action(s) that are performed to fix errors.

FIG. 3 depicts a portion of data indicating the tasks to be performed for deployment of a fix for a software application (170) in an embodiment. Though the content is shown encoded in extensible markup language (XML) according to one convention, other encoding/formats and conventions may be used for representing the tasks. Some of the tasks refer to specific files, which contain new/modified software instructions that potentially replace the pre-existing instructions corresponding to the software application. These files may be received as a payload along with the data of FIG. 3 in a fix that is to be deployed. The content of the received files is not shown as not being necessary to an understanding of the described embodiments.

Lines 311-338 (in between tags "<procedure>" and "</procedure>") depict the procedure (groups of tasks with name "PATCH ACME DB" as specified in line 311) to be performed by self-remediation tool 150 for deploying a fix for software application 170. Each of lines 312-315 (in tag "<variable/>") specifies variables (with corresponding names) indicating that the various occurrences of the names of the variables in the portion of data need to be substituted with corresponding values during deployment. For example, line 314 defines a variable acmeDatabase, which would be set to a string (e.g, to "acme_home" as shown in line 532 below) during deployment by self-remediation tool 150 in all instances of occurrence of the variable in the data of FIG. 3. Some of the variables may point to the specific files that need to be deployed.

Lines 316-337 (in between tags "<tasks>" and "</tasks>") depict the various tasks (constituting the procedure) that need to be performed during deployment of the fix. In particular, lines 317-320 (in tag "<task/>") depict a single task with name "VALIDATE PATCH APPLICABILITY" (in line 317). The task type "OS_COMMAND" (in line 319) determines the manner (i.e., provided by the underlying operating system) in which the command "${acmeDatabase}/bin/validate -patchID ${patchID} -patchSrc ${PatchSrc}" (in line 320) is to be executed for deploying the fix. It may be observed that the command contains references to variables (specified in lines 312-315) such as "acmeDatabase" and "patchID" whose values may be substituted by self-remediation tool 150 before executing the command "validate".

It is further assumed that "validate" command (as well as other commands referred to in the present description) is already present in runtime system 130, and the command is designed to process the parameters passed to it. The "validate" command may perform various validation steps prior to performing other tasks in the subsequent lines of FIG. 3. The commands may further indicate a status (success or failure) of execution once execution is complete. The details of the commands are again not described as not being necessary to appreciate the features of the invention. However the choice and implementation of various commands depends on the specific environment and will be apparent to one skilled in the relevant arts.

Similarly, lines 321-324, lines 325-328, lines 329-332 and lines 333-336 depict various other tasks (with corresponding names "SHUT DB", "PATCH DB", "START DB" and "APPLY SQL DB") that need to be performed during deployment. It may be appreciated that in task "SHUT DB" (depicted in lines 321-324), software application 170 is sought to be terminated thereby terminating the execution of self-remediation tool 150.

In such a scenario, self-remediation tool 150 determines a subset of the tasks that require the termination of the software application. In an embodiment, a first task terminating the software application (that is task "SHUT DB") and a second task restarting the software application (that is "START DB") are determined. The tasks between (and including) the first and second tasks are determined to require the termination of the software application. As such, the tasks "SHUT DB", "PATCH DB" and "START DB" are determined to be in the subset of the tasks.

According to an aspect of the present invention, self-remediation tool 150 replaces the above-determined subset of tasks with a new task to perform the commands (contained in the determined subset of tasks). In an embodiment, the command in each of the tasks in the subset of tasks is included in a new file and the new task contains a command to execute the file (using appropriate software). The description is continued illustrating the manner in which the subset of tasks is replaced with a new task (and the corresponding new file).

5. Replacing Tasks Requiring Termination of Software Application

FIG. 4 depicts a portion of data indicating the tasks to be performed for deployment of a fix for a software application (170) where tasks requiring termination of the software application have been replaced with a new task in an embodiment. Though the content is shown encoded in extensible markup language (XML), other encoding/formats may be used for representing the tasks. Lines 411-420 and 430-435 correspond to respective lines 311-320 and 333-338 and are not described again for conciseness.

Lines 421-425 depict a new task that has been added to replace a subset of tasks ("SHUT DB", "PATCH DB" and "START DB" as depicted in lines 321-332) requiring the termination of the software application. The new task is named "DOWNTIME TASK 1" (in line 421) and is of type "OS_COMMAND" (in line 424). Lines 426-429 depict another newly added task with name "VERIFY TASK 1" (in line 426) and type "VERIFY" (in line 429) indicating that the results of performance of the previous task need to be verified for success.

It may be observed that in each of lines 422 and 427, a new attribute "action" has been added, the value of the attribute indicating the action to be performed by self-remediation tool 150. The value "downtime" indicates that self-remediation tool 150 needs to perform the task after termination of software application 170. The value "verify" (in line 427) on the other hand indicates that self-remediation tool 150 needs to perform the verification of the results of performance of the previous task.

It may be further observed that the command (in line 425) contains the name "genOSScript.sh" of a new file that is generated by including the commands of each of the tasks in the subset of tasks requiring the termination of software application 170. Example contents of such a file are described below with respect to FIG. 5.

FIG. 5 depicts a portion of a file containing the commands to be executed for deployment of a fix in software application 170 after the termination of software application 170 in an embodiment.

Lines 531-533 depict a command to be executed for terminating the software application and correspond to the command contained in task "SHUT DB" (as depicted in lines 321-324). Line 531 depicts a comment (and is not executed) containing the description "Shuts down the Acme database" of the task (in line 322). Line 532 depicts the command "${acme-home}/bin/shutdown" contained in the task (as in line 324 with the variable "acmeDatabase" replaced with the corresponding value "acme_home"). Line 533 depicts a command (that is added during generation of the file) indicating that the results of execution and/or the various operations (as supported in the underlying operating environment) performed during execution of the previous command (in line 532) are to be added to a log file.

Similarly, lines 534-536 and 537-539 depict commands contained in tasks "PATCH DB" (in lines 325-328) and "START DB" (in line 329-332) respectively. It may be observed that after the execution of each command, the results/operations performed are added to the log file. By inspecting the contents of the log file, self-remediation tool 150 (or a user) may verify that the subset of tasks (performed during the termination of self-remediation tool 150) was successfully performed.

Thus, the subset of tasks requiring termination of software application 170 (and self-remediation tool 150) is replaced by a new task (with a corresponding new file containing the commands of the subset of tasks). The translated tasks (including the new task, as shown in FIG. 4) are then executed by self-remediation tool 150 to perform self-remediation as described in detail below.

6. Performing Self-Remediation

Self-remediation tool 150 on receiving the translated tasks (of FIG. 4) may execute the tasks in sequence based on the action (the attribute "action") specified in the task. In the scenario where no action is specified (such as in tasks "VALIDATE PATCH APPLICABILITY" and "APPY SQL DB"), the commands specified in the tasks (i.e., lines 417-420 before termination of execution of the software application and lines 430-433 after restart of the software application) are executed during the execution of the software application.

If the action is specified as "downtime" (such as in tasks "DOWNTIME TASK 1"), self-remediation tool 150 initializes a new process for performing the task by executing the commands contained in a specified file (for example, the content of a file as depicted in FIG. 5). The commands executed by the new process may include commands to terminate the software application, perform the deployment of fixes and restart the software application (typically the last command in the file). On restart, self-remediation tool 150 determines the next task "VERIFY TASK 1" to be performed which may be determined by inspecting information (indicating the last task performed) stored in a non-volatile memory as described in detail below.

As the action of the task "VERIFY TASK 1" specifies, "verify", self-remediation tool 150 determines whether the previous downtime task was performed successfully. The success of the previous downtime task may be determined by inspecting the log file generated by the various commands executed by the new process during the downtime task. In the scenario, that the downtime task is successfully completed, self-remediation tool 150 continues the performance of the other tasks specified in the procedure. The description is continued describing the manner in which information (indicating the tasks performed during deployment of a fix) is stored in a non-volatile memory.

FIG. 6 depicts the content of a table (in a database) specifying information indicating the tasks performed during deployment of a fix in an embodiment. Column 610 ("ProcedureName") indicates the name of the procedure, which is being performed for deployment of a fix. Column 620 ("TaskName") indicates the name of the task (contained in the procedure) that has been performed during deployment of the fix. Column 630 ("DateTime") indicated the date and time of performance of the corresponding task in the procedure. Column 640 ("Status") indicates the status of performance of the corresponding task during deployment.

Rows 655 depicts a task "VALIDATE PATCH APPLICABILITY" (in column 620) in a procedure "PATCH ACME DB" (in column 610) that has been executed successfully ("Success" in column 640) on Nov. 23, 2006 at 01:30 (in column 630). Similarly, rows 660, 665 and 670 depict other tasks in the same procedure (since the value in column 610 is the same for the different rows) executed successfully at various times as specified in column 630. It may be observed that the status (column 640) of row 660 does not contain a value, since the status of execution of the downtime task in row 660 is determined by the verification task in row 665.

It should be appreciated that the features described above can be implemented in various embodiments as a desired combination of one or more of hardware, software and firmware. The description is continued with respect to example implementations of self-remediation tool 150.

7. Self-Remediation Tool

Figure 7:
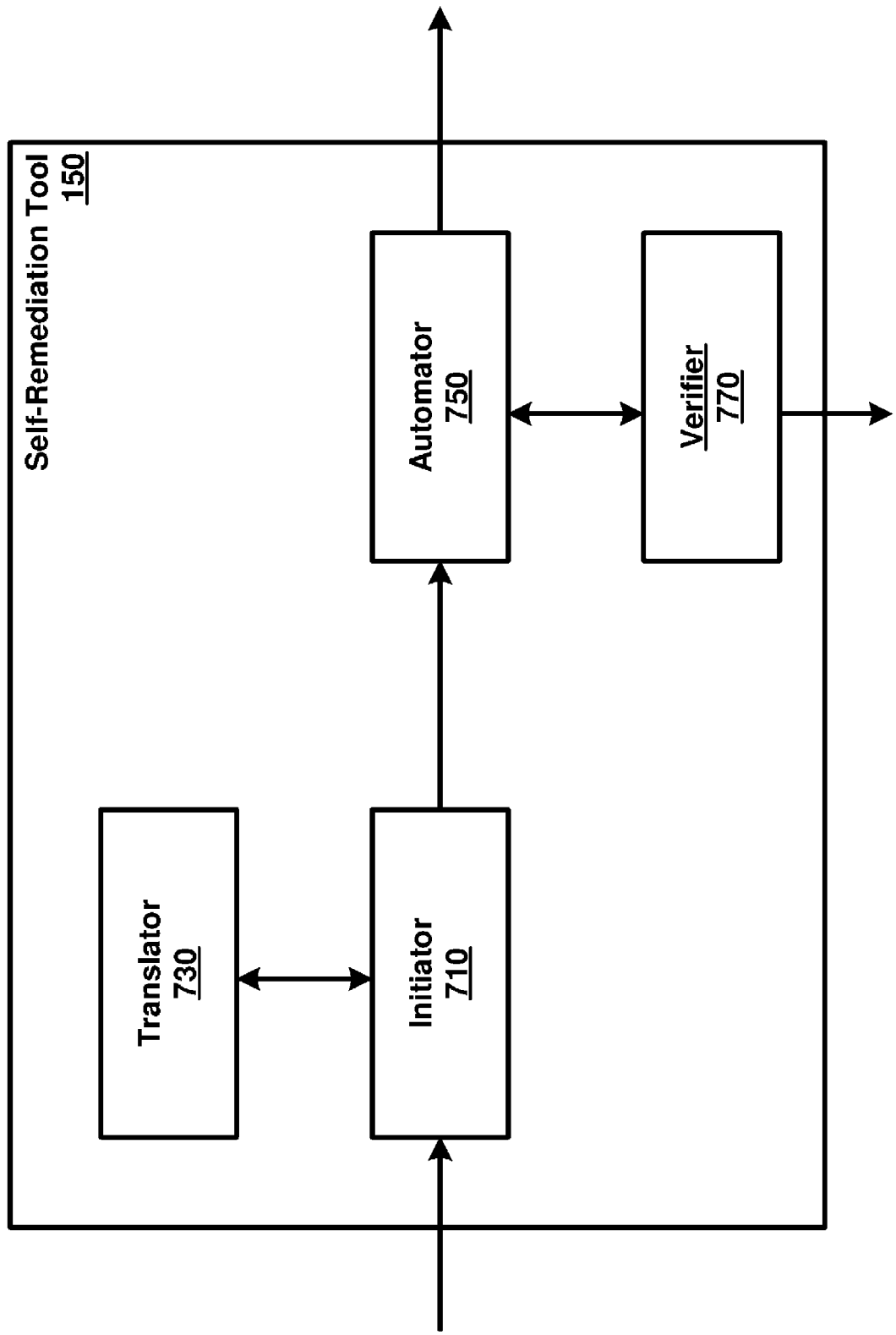
FIG. 7 is a block diagram illustrating the details of a self-remediation tool in an embodiment.

FIG. 7 is a block diagram illustrating the details of a self-remediation tool in an embodiment. The block diagram is shown with initiator 710, translator 730, automator 750, and verifier 770. Each block is described in detail below.

Initiator 710 represents software instructions that are executed on initialization of self-remediation tool 150. Initiator 710 receives data indicating the set of tasks to be performed to fix an error in software application 170. The data may be received in the format depicted in FIG. 3 (containing the set of tasks) or FIG. 4 (the translated tasks), for example, from a non-volatile memory or on a network from developer system 140. Initiator 710 passes control to automator 750 if the tasks received are determined to be translated tasks and to translator 730 otherwise.

Translator 730 receives the set of tasks to be performed and determines the subset of tasks whose performance requires termination of execution of software application 170. In an embodiment, translator 730 translates the set of tasks by replacing each of the determined subset of tasks with a corresponding new task as described above with respect to FIG. 4. Translator 730 sends the translated set of tasks (of FIG. 4) to initiator 710.

Automator 750 receives a set of translated tasks from initiator 710 and performs each of the tasks based on the action attribute of each task as described in the above section. Automator 750 inspects information stored in a non-volatile memory (as depicted in FIG. 6) to determine the next task to be performed. In an embodiment, a procedure name (identifying the set of tasks) is used to determine the next task to be performed.

Automator 750 may initiate a new process (which may terminate self-remediation tool 150 along with software application 170) to perform the task identified with action "downtime", as described above. On the other hand, for a task with action 'verify', automator 750 passes control to verifier 770. Upon receiving status information from verifier 770, automator 750 may update the non-volatile memory and continue performance of the next task.

Verifier 770 reads the log file (not shown) updated by the new process and determines the status of the commands executed during the performance of the downtime task (when execution of software application 170 is terminated). Verifier 770 may indicate the determined status to automator 750.

The description is continued with respect to an embodiment in which various features are operative when software instructions are executed.

8. Digital Processing System

Figure 8:
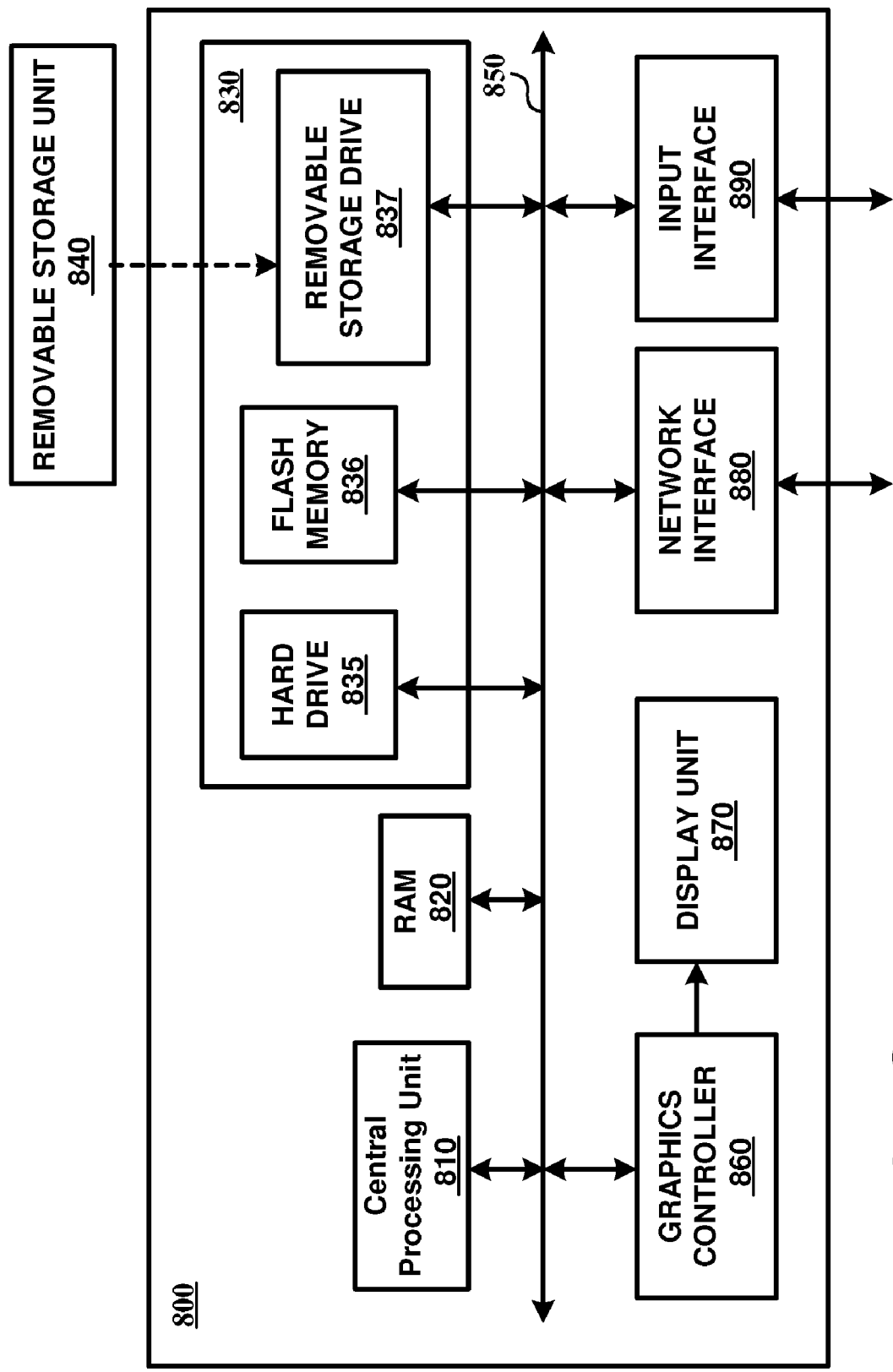
FIG. 8 is a block diagram illustrating the details of digital processing system in which various aspects of the present invention are operative by execution of appropriate software instructions.

FIG. 8 is a block diagram illustrating the details of digital processing system 800 in which various aspects of the present invention are operative by execution of appropriate software instructions. Digital processing system 800 may correspond to runtime system 130 (executing software application 170. thereby self-remediation tool 150). Digital processing system 800 may contain one or more processors (such as a central processing unit (CPU) 810), random access memory (RAM) 820, secondary memory 830, graphics controller 860, display unit 870, network interface 880, and input interface 890. All the components except display unit 870 may communicate with each other over communication path 850, which may contain several buses as is well known in the relevant arts. The components of FIG. 8 are described below in further detail.

CPU 810 may execute instructions stored in RAM 820 to provide several features of the present invention. CPU 810 may contain multiple processing units, with each processing unit potentially being designed for a specific task. Alternatively, CPU 810 may contain only a single general purpose processing unit. RAM 820 may receive instructions from secondary memory 830 using communication path 850.

Graphics controller 860 generates display signals (e.g., in RGB format) to display unit 870 based on data/instructions received from CPU 810. Display unit 870 contains a display screen to display the images defined by the display signals. Input interface 890 may correspond to a keyboard and a pointing device (e.g., touch-pad, mouse). Network interface 880 provides connectivity to a network (e.g., using Internet Protocol), and may be used to communicate with others connected systems (e.g., to receive fixes from developer system 140) of FIG. 1.

Secondary memory 830 may contain hard drive 835, flash memory 836, and removable storage drive 837. Secondary memory 830 may store the data (e.g., portions of data depicted in FIGS. 3, 4 and 5) and software instructions (e.g., constituting software application 170 and self-remediation tool 150), which enable system 800 to provide several features in accordance with the present invention. Some or all of the data and instructions may be provided on removable storage unit 840, and the data and instructions may be read and provided by removable storage drive 837 to CPU 810. Floppy drive, magnetic tape drive, CD-ROM drive, DVD Drive, Flash memory, removable memory chip (PCMCIA Card, EPROM) are examples of such removable storage drive 837.

Removable storage unit 840 may be implemented using medium and storage format compatible with removable storage drive 837 such that removable storage drive 837 can read the data and instructions. Thus, removable storage unit 840 includes a computer readable storage medium having stored therein computer software and/or data. However, the computer readable storage medium can be in other forms (e.g., non-removable, random access, etc.).

In this document, the term "computer program product" is used to generally refer to removable storage unit 840 or hard disk installed in hard drive 835. These computer program products are means for providing software to system 800. CPU 810 may retrieve the software instructions, and execute the instructions to provide various features of the present invention described above.

CONCLUSION

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents. Also, the various aspects, features, components and/or embodiments of the present invention described above may be embodied singly or in any combination in a data storage system such as a database system.

What is claimed is:

1. A method of fixing an error in a software application, said method comprising:
   receiving in said software application, data indicating a set of tasks to be performed for fixing said error;
   determining, in said software application, a first subset of tasks requiring termination of execution of said software application and a second subset of tasks which are to be performed during execution of said software application, wherein each of said first subset of tasks and said second subset of tasks is contained in said set of tasks;
   performing, in said software application, said second subset of tasks during execution of said software application,
   wherein said receiving and determining are also performed during execution of said software application; and
   initiating, from said software application, execution of a new process after performing said second subset of tasks,
   wherein said new process, upon execution, terminates said software application, performs said first subset of tasks during said non-execution state of said software application and restarts execution of said software application after performing said first subset of tasks,
   wherein said first subset of tasks are performed during the non-execution state of said software in response to said initiating and wherein both of said first subset of tasks and said second subset of tasks are performed to fix said error.

2. The method of claim 1, wherein said software application contains a plurality of software instructions,
   wherein said set of tasks, when performed, modify a subset of instructions contained in said plurality of instructions,
   wherein said plurality of software instructions contain a first set of instructions forming a self-remediation tool is for fixing errors in said software application,
   wherein said self-remediation tool performs said second subset of tasks,
   wherein said error is within said self-remediation tool and said first subset of tasks modifies a part of said subset of instructions, which are within said first set of instructions, thereby requiring said software application to be in said non-execution state for modification of said part of said subset of software instructions when said first subset of tasks are performed by said initiated new process.

3. The method of claim 1, wherein said new process stores in a non-volatile memory status of execution of each of said first subset of tasks, said method further comprising:
   inspecting said non-volatile memory in said software application to verify whether said first subset of tasks are performed successfully upon restarting of said software application.

4. The method of claim 1, further comprising:
   storing said first subset of tasks in a file, wherein said new process performs tasks stored in said file.

5. The method of claim 4, wherein each of said set of tasks is associated with a corresponding one of a set of commands, wherein performance of a task in said set of tasks is effected by execution of corresponding set of commands, said method further comprising:
   generating a script containing a first subset of commands, wherein each of said first subset of commands is associated with a corresponding one of said first subset of tasks, wherein said storing stores said script in said file; and
   replacing said first subset of tasks in said set of tasks with a new task associated with a new command, wherein said new command executes said script to effect the performance of said first subset of commands;
   wherein said new command causes said initiating execution of said new process.

6. The method of claim 1, further comprising:
   storing in a non-volatile memory data indicating the tasks performed before said terminating; and inspecting in said software application, said non-volatile memory to determine a next task to be performed after said software application is restarted.

7. The method of claim 1, wherein said determining comprises examining said data to identify both of said first subset of tasks and said second subset of tasks.

8. A non-transitory computer readable medium storing one or more sequences of instructions for causing a system to fix an error in a software application, wherein execution of said one or more sequences of instructions by one or more processors contained in said system causes said system to perform the actions of:
receiving in said software application, data indicating a set of tasks to be performed for fixing said error;
determining, in said software application, a first subset of tasks requiring termination of execution of said software application and a second subset of tasks which are to performed during execution of said software application, wherein each of said first subset of tasks and said second subset of tasks is contained in said set of tasks;
performing, in said software application, said second subset of tasks during execution of said software application,
wherein said receiving and determining are also performed during execution of said software application; and
initiating, from said software application, execution of a new process after performing said second subset of tasks,
wherein said new process, upon execution, terminates said software application, perform said first subset of tasks during said non-execution state of said software application and restart execution of said software application after performing said first subset of tasks,
wherein said first subset of tasks are performed during the non-execution state of said software in response to said initiating and wherein both of said first subset of tasks and said second subset of tasks are performed to fix said error.

9. The non-transitory computer readable medium of claim 8, wherein said software application contains a plurality of software instructions,
wherein said set of tasks, when performed, modify a subset of instructions contained in said plurality of instructions,
wherein said plurality of software instructions contain a first set of instructions forming a self-remediation tool is for fixing errors in said software application,
wherein said self-remediation tool performs said second subset of tasks,
wherein said error is within said self-remediation tool and said first subset of tasks modifies a part of said subset of instructions, which are within said first set of instructions, thereby requiring said software application to be in said non-execution state for modification of said part of said subset of software instructions when said first subset of tasks are performed by said initiated new process.

10. The non-transitory computer readable medium of claim 8, wherein said new process stores in a non-volatile memory status of execution of each of said first subset of tasks, further comprising on or more instructions for:
inspecting said non-volatile memory in said software application to verify whether said first subset of tasks are performed successfully upon restarting of said software application.

11. The non-transitory computer readable medium of claim 8, further comprising one or more instructions for:
storing said first subset of tasks in a file, wherein said new process performs tasks stored in said file.

12. The non-transitory computer readable medium of claim 11, wherein each of said set of tasks is associated with a corresponding one of a set of commands, wherein performance of a task in said set of tasks is effected by execution of corresponding set of commands, further comprising one or more instructions for:
generating a script containing a first subset of commands, wherein each of said first subset of commands is associated with a corresponding one of said first subset of tasks, wherein said storing stores said script in said file; and
replacing said first subset of tasks in said set of tasks with a new task associated with a new command, wherein said new command executes said script to effect the performance of said first subset of commands;
wherein said new command causes said initiating execution of said new process.

13. The non-transitory computer readable medium of claim 8, further comprising one or more instructions for:
storing in a non-volatile memory data indicating the tasks performed before said terminating; and
inspecting said non-volatile memory to determine a next task to be performed after said software application is restarted.

14. The non-transitory computer readable medium of claim 8, wherein said determining comprises one or more instructions for examining said data to identify both of said first subset of tasks and said second subset of tasks.

15. A system of fixing an error in a software application, said system comprising a processor and a memory, which together provide:
means for receiving in said software application, data indicating a set of tasks to be performed for fixing said error;
means for determining, in said software application, a first subset of tasks requiring termination of execution of said software application and a second subset of tasks which are to be performed during execution of said software application, wherein each of said first subset of tasks and said second subset of tasks is contained in said set of tasks;
means for performing, in said software application, said second subset of tasks during execution of said software application,
wherein said means for receiving and said means for determining are operative during execution of said software application; and
means for initiating, from said software application, execution of a new process after performing said second subset of tasks,
wherein said new process, upon execution, terminates said software application, performs said first subset of tasks during said non-execution state of said software application and restarts execution of said software application after performing said first subset of tasks,
wherein said first subset of tasks are performed during the non-execution state of said software in response to said initiating and wherein both of said first subset of tasks and said second subset of tasks are performed to fix said error.

16. The system of claim 15, wherein said software application contains a plurality of software instructions,
wherein said set of tasks, when performed, modify a subset of instructions contained in said plurality of instructions, wherein said plurality of software instructions contain a first set of instructions forming a self-remediation tool is for fixing errors in said software application, wherein said self-remediation tool performs said second subset of tasks, wherein said error is within said self-remediation tool and said first subset of tasks modifies a part of said subset of instructions, which are within said first set of instructions, thereby requiring said software application to be in said non-execution state for modification of said part of said subset of software instructions when said first subset of tasks are performed by said initiated new process.

17. The system of claim 15, wherein said new process stores in a non-volatile memory status of execution of each of said first subset of tasks, said system further comprising:

means for inspecting said non-volatile memory in said software application to verify whether said first subset of tasks are performed successfully upon restarting of said software application.

18. The system of claim 15, wherein each of said set of tasks is associated with a corresponding one of a set of commands, wherein performance of a task in said set of tasks is effected by execution of corresponding set of commands, said system further comprising:

means for generating a script containing a first subset of commands, wherein each of said first subset of commands is associated with a corresponding one of said first subset of tasks;

means for storing said script in a file, wherein said new process performs tasks stored in said file;

means for replacing said first subset of tasks in said set of tasks with a new task associated with a new command, wherein said new command is executes said script to effect the performance of said first subset of commands;

wherein said new command causes said initiating execution of said new process.

19. The system of claim 15, further comprising:

means for storing in a non-volatile memory data indicating the tasks performed before said terminating; and means for inspecting said non-volatile memory to determine a next task to be performed after said software application is restarted.

20. The system of claim 15, wherein said means for determining comprises means for examining said data to identify both of said first subset of tasks and said second subset of tasks.

* * * * *

UNITED STATES PATENT AND TRADEMARK OFFICE
CERTIFICATE OF CORRECTION

| | | |
|---|---|---|
| PATENT NO. | : 8,024,707 B2 | Page 1 of 1 |
| APPLICATION NO. | : 11/690143 | |
| DATED | : September 20, 2011 | |
| INVENTOR(S) | : Manglik et al. | |

It is certified that error appears in the above-identified patent and that said Letters Patent is hereby corrected as shown below:

In column 3, line 62, delete "taks" and insert -- tasks --, therefor.

In column 4, line 25, delete "decribed" and insert -- described --, therefor.

In column 6, line 54, delete "acme-home" and insert -- acme_home --, therefor.

In column 7, line 14, delete "APPY" and insert -- APPLY --, therefor.

In column 11, line 18, in Claim 8, after "to" insert -- be --.

In column 12, line 41, in Claim 15, after "to" insert -- be --.

In column 14, line 9, in Claim 18, after "command" delete "is".

Signed and Sealed this
Sixth Day of December, 2011

David J. Kappos
*Director of the United States Patent and Trademark Office*